United States Patent
Muzslay et al.

(10) Patent No.: US 6,400,137 B1
(45) Date of Patent: Jun. 4, 2002

(54) OPTICAL FIBER WITH CRIMP AND FOR SENSING WHEEL ROTATION

(75) Inventors: Steven Zoltan Muzslay, Huntington Beach, CA (US); Michael Herbert Bayer, White Lake, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/146,847

(22) Filed: Sep. 3, 1998

(51) Int. Cl.[7] .............................. G01D 3/36; G02B 6/36
(52) U.S. Cl. ............................ 324/175; 385/78; 385/81
(58) Field of Search ................................ 324/175, 166; 250/231.1, 231.13, 231.14, 231.17, 227.14, 227.28, 227.29; 435/321; 220/309.1; 425/303; 29/751; 385/78, 77, 58, 81

(56) References Cited

U.S. PATENT DOCUMENTS

| | | | |
|---|---|---|---|
| 3,523,351 A | * 8/1970 | Filia | 29/751 |
| 3,524,067 A | 8/1970 | West | 250/219 |
| 3,954,339 A | 5/1976 | Atwood et al. | 356/152 |
| 4,096,383 A | 6/1978 | Mancini et al. | 250/231 |
| 4,217,084 A | * 8/1980 | Jacques et al. | 425/321 |
| 4,607,160 A | 8/1986 | Sakakino | 250/227 |
| 4,654,523 A | 3/1987 | Tanaka et al. | 250/231 |
| 4,667,098 A | * 5/1987 | Everett | 250/231 SE |
| 4,695,124 A | * 9/1987 | Himono et al. | 350/96.2 |
| 4,767,164 A | * 8/1988 | Yeung | 303/91 |
| 4,870,270 A | 9/1989 | Brennan | 250/227 |
| 4,888,076 A | * 12/1989 | Martin | 156/245 |
| 4,964,805 A | 10/1990 | Gabany | 439/63 |
| 5,015,056 A | 5/1991 | Yamaguchi et al. | 350/96.15 |
| 5,038,031 A | * 8/1991 | Kurosawa et al. | 250/231.14 |
| 5,088,937 A | 2/1992 | Gabany | 439/581 |
| 5,168,268 A | 12/1992 | Levy | 340/709 |
| 5,215,470 A | 6/1993 | Henry et al. | 439/63 |
| 5,248,881 A | 9/1993 | Kaminaga et al. | 250/227.21 |
| 5,321,258 A | 6/1994 | Kinney | 250/227.21 |
| 5,436,988 A | 7/1995 | Narendran | 385/26 |
| 5,602,946 A | 2/1997 | Veeser et al. | 385/12 |

* cited by examiner

Primary Examiner—Jay Patidar
(74) Attorney, Agent, or Firm—Roger C. Turner

(57) ABSTRACT

Apparatus for replacing an electromagnetic device that senses vehicle wheel rotation by detecting slots in a rotary device, where the replacement apparatus avoids interaction with stray magnetic fields. A replacement apparatus (24) includes a connector frame (60) that holds a pair of optical fibers (40,42) having parallel front end portions. The frame forms a pair of highly reflective surfaces (70,72) that are angled so light moving forwardly from the first optical fiber tip is reflected through the slots to the tip of the second optical fiber. The optical fibers of the connector have rear end portions (110) where a sheath (44) of the optical cable has been stripped away. A metal ferrule (54) has a rear portion (112) that closely receives the bare optical fiber rear portion in a sliding fit therewith, the ferrule having a forward portion that is crimped around the sheath in a circular crimp (122).

8 Claims, 3 Drawing Sheets

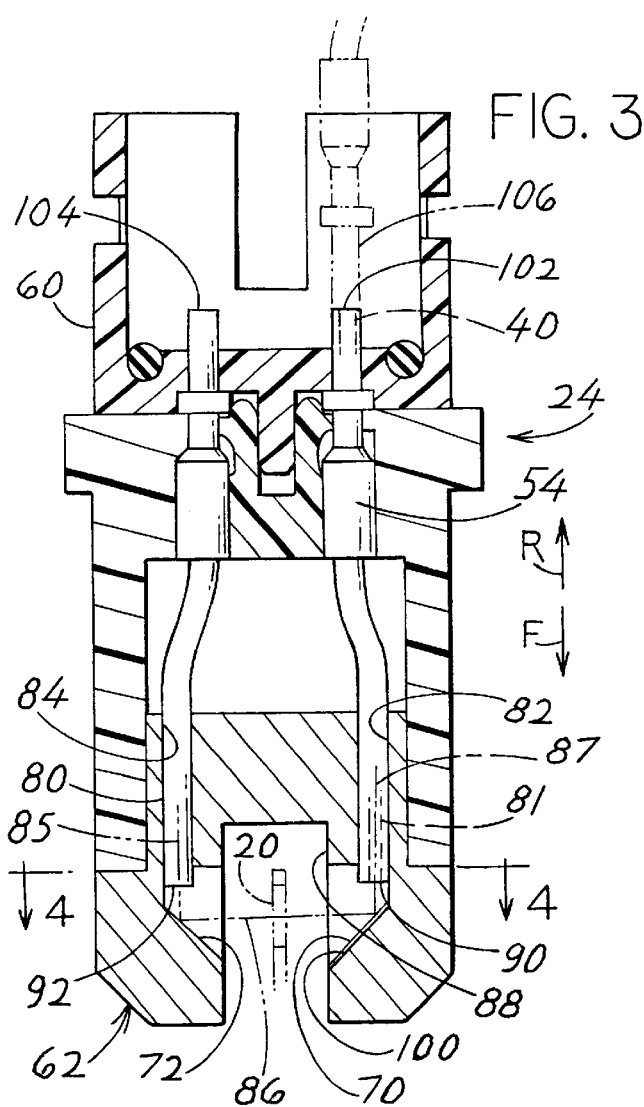
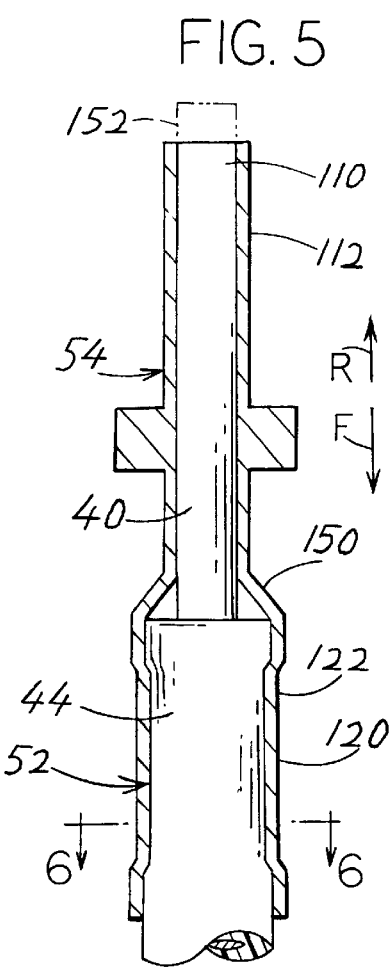
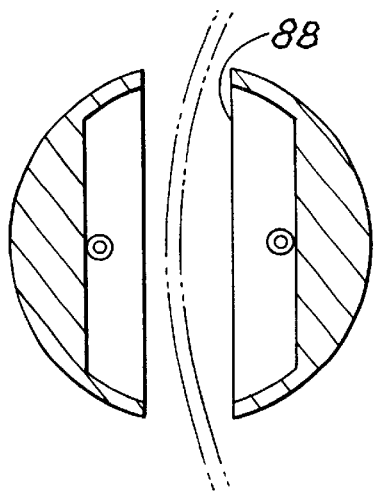
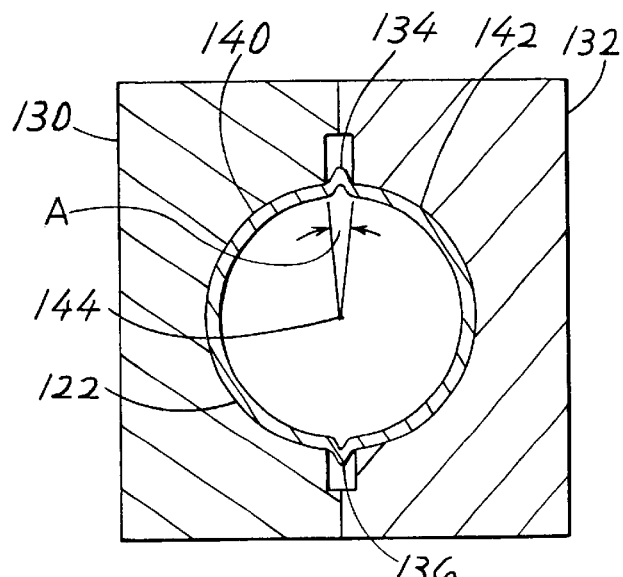
FIG. 3
FIG. 5
FIG. 4
FIG. 6

OPTICAL FIBER WITH CRIMP AND FOR SENSING WHEEL ROTATION

BACKGROUND OF THE INVENTION

The speed and traveled distance of vehicle wheels are commonly sensed by use of an iron rotary device that is fixed to the wheel shaft and that has a cylindrical portion with slots therein. An electromagnetic sensor detects the slots to provide pulses indicating wheel rotation. The electromagnetic sensor is subject to errors caused by magnetic fields such as those near electric utility wires, and magnetic sensors buried in the pavement to detect vehicles. Furthermore, the electromagnetic sensors and iron rotating device with slots, adds weight to the vehicle. An apparatus that could replace presently designed electromagnetic sensors and avoid interference problems, and which could even enable reduction in weight of the rotary device with slots, would be of value.

SUMMARY OF THE INVENTION

In accordance with one embodiment of the present invention, an apparatus is provided for sensing rotation of a wheel that can rotate about a wheel axis on a housing, which avoids electromagnetic and magnetic interference problems and which can result in reduced weight. The apparatus includes a frame that is mounted on the housing in place of the electromagnetic sensor, and first and second optical fibers mounted on the frame, with the fibers having forward fiber tips extending primarily parallel to each other. The frame also has a pair of light-reflective surfaces oriented to direct light from a first of the fiber tips to a second of the fiber tips, along a light path that extends through the slots of the optical area of the rotary device. The use of a pair of light-reflective surfaces avoids the need to bend one or both optical fibers about a short radius of curvature, so that large diameter (at least about 0.5 mm) optical fibers can be used for ruggedness and low-cost connections.

The frame is part of a connector, and each optical fiber is part of a short cable that includes a sheath. The sheath is removed at a rear end of the optical cable to leave a bare fiber rear end portion. A metal ferrule has a rear end portion that receives the bare optical fiber rear portion in a close sliding fit therewith, and the ferrule having a front portion that is crimped around the sheath. The front portion is preferably crimped in a circular crimp that leaves a plurality of circular crimp sections that all lie on a circle, with no more than about 40° of the crimp circumference not lying on the circle. This results in substantially uniform compressive force applied to the optical fiber to avoid damage to it.

The novel features of the invention are set forth with particularity in the appended claims. The invention will be best understood from the following description when read in conjunction with the accompanying drawings.

BRIEF DESCRIPTION OF THE DRAWINGS

FIG. 3 is an enlarged view of the connector of the apparatus of FIG. 2.

FIG. 4 is a view taken on line 4—4 of FIG. 3.

FIG. 5 is an enlarged sectional view of the ferrule and optical cable of FIG. 3.

FIG. 6 is a view taken on line 6—6 of FIG. 5, shown during crimping of the ferrule.

DESCRIPTION OF THE PREFERRED EMBODIMENTS

Figure 1:
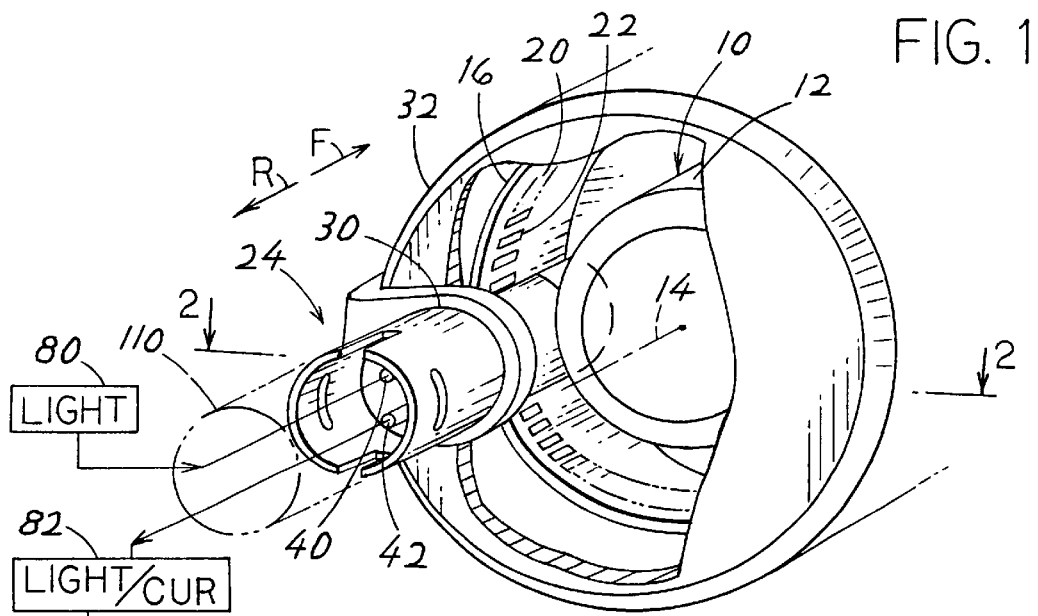
FIG. 1 is a partial isometric view of apparatus for sensing rotation of a wheel, with a portion of the housing being broken away.

FIG. 1 illustrates a portion of a vehicle wheel assembly 10 which includes a shaft 12 having an axis of rotation 14. A rotary device 16 that is fixed to the shaft to rotate with it, has an optical area 20 with a plurality of slots 22 that are angularly spaced apart. An apparatus 24 for sensing rotation of the wheel assembly, does this by sensing passage of the slots 22. In the prior art, this was accomplished by a magnetic sensor. The rotary device 16 is formed of iron and the prior sensor detected changes in the magnetic field by the passage of the slots and the areas in between the slots. Such a sensor could be affected and could affect stray magnetic fields such as those from power lines and vehicle sensors lying in roads, and even the electrical signals from the sensor to a rotation calculating circuit could be affected unless a costly shielded cable was used. Applicant avoids these disadvantages by using an apparatus 24 that can replace the prior sensor, as by fitting into the same hole 30 in a vehicle housing 32 that held a prior sensor, but with the present apparatus 24 using light to detect the passage of the slots 22 as the wheel assembly rotates.

Figure 2:
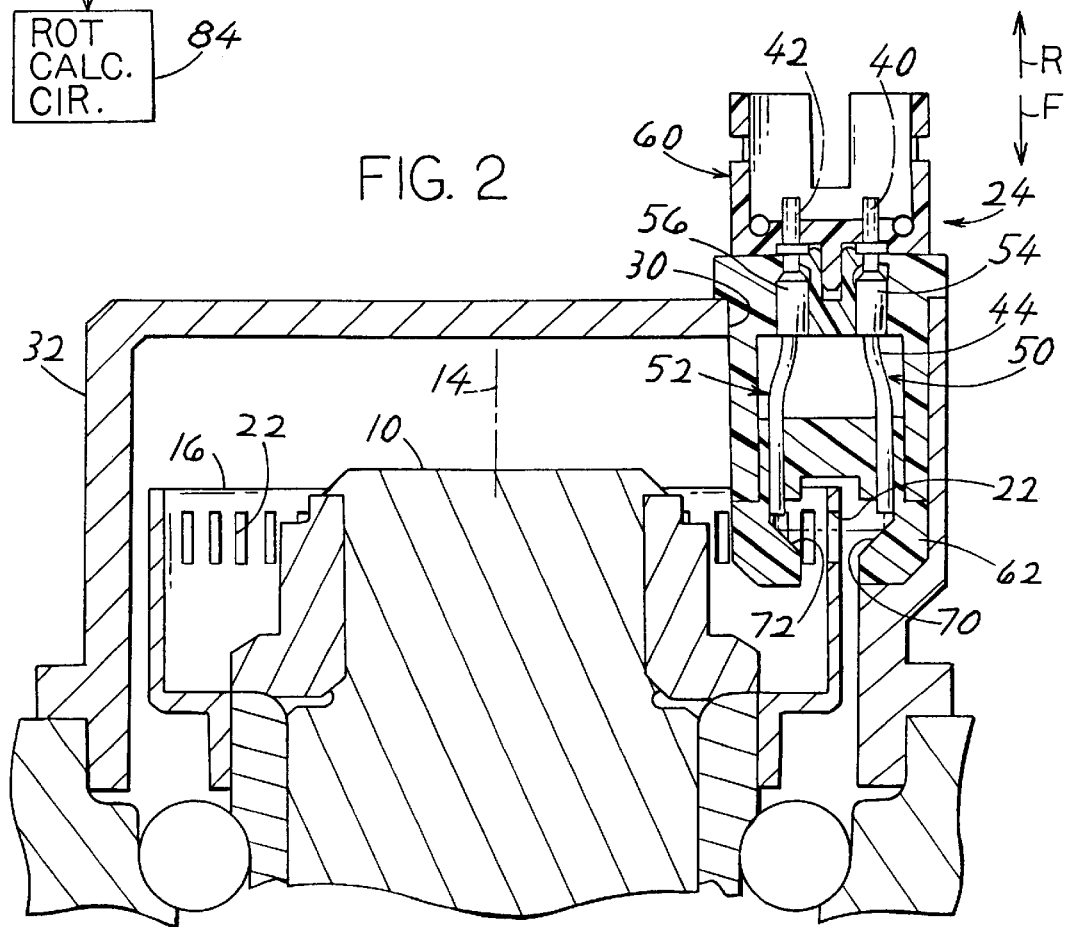
FIG. 2 is a view taken on line 2—2 of FIG. 1.

As shown in FIG. 2, the apparatus 24 includes a pair of optical fibers 40, 42 that lie in sheaths 44 of optical cables 50, 52. The rear portions of the cables are held on ferrules 54, 56, with each ferrule being mounted on a connector frame 60. The frame 60 is designed to mount into the hole 30 of the housing 32, in place of a prior electromagnetic sensor. The frame includes a front frame part 62 with a pair of highly reflective surfaces 70, 72. Light passes forwardly F through one of the optical fibers 40, is reflected from one surface 70 to pass through a slot 22, and is reflected from the other surface 72 to pass into the second optical fiber 42. FIG. 1 shows that a light source 80 directs light at one optical fiber such as 40, and that a light-to-current converter, or light sensor 82 detects light from the other optical fiber 42 and delivers a current representing the light to a rotation calculating circuit 84. The same calculating circuit 84 can be used, as was used for the prior electromagnetic sensor.

FIG. 3 shows that forward portions 80 of the short or stub optical cables (which each includes a single optical fiber and sheath) are closely positioned within passages 82, 84 in the front frame part 62 that also forms the reflective surfaces 70, 72. The front portions 80 of the cables and front portions 81 of the optical fibers extend primarily parallel to each other, with the axis 85 of one fiber front end lying radially inward of the cylindrical optical area and with the axis 87 of the other fiber lying radially outside the optical area (with respect to axis 14). The frame has a slot-like opening 88 through which the slotted cylindrical optical area 20 extends.

The reflective surfaces 70, 72 are angled about 45 degrees from the axis of rotation of the wheel assembly. Light moves in the path indicated at 86 from the forward tip 90 of one optical fiber, is reflected from the first surface 70 and passes through a slot in the rotary device, and is reflected by the second surface 72 into the second fiber forward tip 92. It can be seen in FIG. 3 that the fiber tips are close enough to the reflective surfaces 70, 72, that an imaginary line 94 connecting the tips of the optical fibers passes through the rotary device. It also can be seen that the fiber tips are substantially flat and that there is no lens between each fiber tip and an adjacent reflective surface.

It would be possible to bend the forward ends of the optical fibers so their tips 90, 92 faced each other and were separated only by the optical area 20 of the rotary device. However, in order for the apparatus 24 to be compact, this would require bending of the optical cables about a small radius of curvature, which could damage the fiber and/or require a very small diameter (under 0.5 mm) optical fiber which is difficult to couple to. Applicant's use of a pair of optical fibers whose forward ends extend primarily parallel to each other, and with the light directed by reflective surfaces that are preferably formed on the same part that holds the optical cable front ends, enables the passage of light through the slots without requiring sharp bending of the optical fibers.

The forward frame part 62 is preferably a molded plastic part, although it can be machined. A subsurface 100 formed by the molded or machined part is plated, as with chrome, to provide a highly light reflective surface 70, that is more reflective than the material of most of the forward frame part 62, especially in use (in a corrosive atmosphere).

Each optical fiber of the apparatus 24 has a rear tip 102, 104. A mating connector, shown at 110 in FIG. 1, can be of the type shown in U.S. Pat. No. 5,639,255, except that optical fibers are used in place of electrical contacts.

FIG. 3 shows a mating fiber assembly 106, whose fiber tip abuts the fiber rear tip 102 of the fiber 40. The ferrule 54 that holds the rear portion of the fiber, is mounted on the frame 60 of the apparatus 24.

As shown in FIG. 5, the ferrule 54 is preferably formed of metal. The cable sheath 44 is removed to leave a bare optical fiber rear end portion 110. The ferrule has a rear end portion 112 that closely (preferably a clearance of less than 0.005 inch) surrounds the fiber rear portion 110, but in a sliding fit that allows the fiber portion 110 to slide with respect to the ferrule portion 112. The ferrule has a front portion 120 of larger diameter than the rear portion, and which surrounds the sheath 44 and which is crimped to it in a crimp 122. The crimp 122 is a circular crimp, in that almost the entire cross-sectional area of the crimp is circular.

FIG. 6 shows a pair of dies 130, 132 that are used to form the circular crimp 122. The dies deform the ferrule to leave small projections 134, 136, and to leave circular crimp sections 140, 142 that subtend at least 320° of the entire 360° of the crimp around the axis 144 of the optical cable. That is, each projection subtends an angle A of no more than 20° and preferably no more than 10°. Applicant can turn the dies 130, 132 by ninety degrees to form four small projections, and four circular crimped sections that each subtend a large angle so the total angle of the circular sections is at least 320°. Applicant's use of a circular crimp results in an avoidance of localized stresses on the optical cable and the optical fiber within it to avoid damage to the optical fiber.

As shown in FIG. 5, applicant initially strips the sheath 44 from the rear end of the optical cable stub 40 and inserts the cable rearward into the ferrule until the sheath lies against a tapered part 150 of the ferrule. The rear tip of the optical fiber may lie at 152, and is merely cut off, as with a hacksaw. Because of the fact that the optical fiber is not bent by perhaps 90° about a small radius of curvature, applicant can use a thick optical fiber of plastic, which is preferably at least 0.5 mm and preferably 1 mm in diameter for ruggedness and to facilitate coupling the ends of two fibers. It is noted that the magnetic properties of the rotary device are not relevant for optical sensing, so the rotary device can be replaced by a lightweight plastic rotary device.

Figure 7:
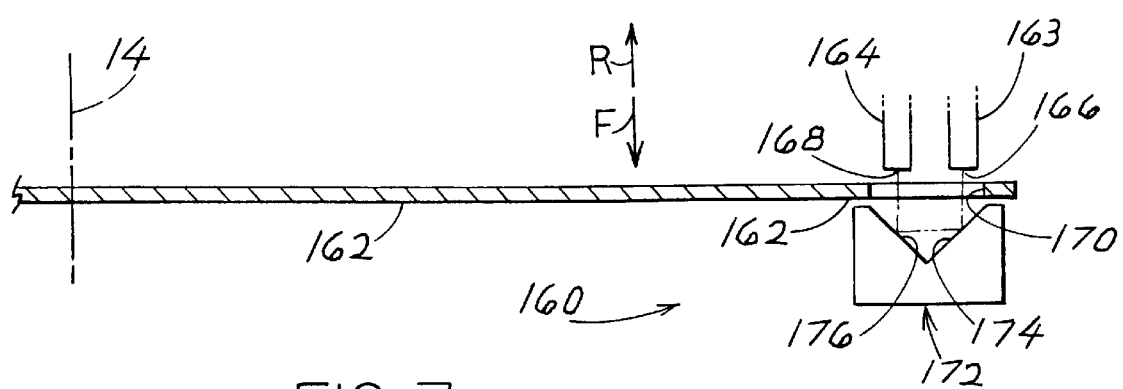
FIG. 7 is a simplified partial view of apparatus for sensing rotation of a wheel, constructed in accordance with another embodiment of the invention.

FIG. 7 shows another system 160, where the optical area 162 is in the form of a disk instead of a cylinder. A pair of optical fibers 163, 164 lie parallel with their tips 166, 168 lying rearward of the disk optical area 162 that has slots 170 therein. A reflector 172 with a pair of reflective surfaces 174, 176 angled 90° to each other, lies forward of the disk. The reflector 172 reflects light from one fiber where the light has passed through the slot, again through the slot and to the other fiber 164. Instead of using two reflective surfaces, it is possible to use a prism which is the equivalent of other reflective surfaces. Instead of slots that are filled with air or transparent material, it is possible to provide reflective elements although this results in less reliability.

Thus, the invention provides apparatus for sensing rotation of a wheel by sensing slots in an optical area of a rotary device, which is not affected by electromagnetic or magnetic fields, and which can be substituted for an electromagnetic sensor. The apparatus includes a connector frame that is mounted on a housing in which the wheel rotates, the frame holding a pair of optical fibers with tips that extend primarily parallel to each other. The frame also forms a pair of light-reflective surfaces that are oriented to direct light from a first of the fiber tips to a second of the fiber tips, along a light path that extends through the slots of the optical area of the rotary device. Where the optical area is cylindrical, axes of the fiber tips lie on radially opposite sides of the cylindrical optical area, as do the reflective surfaces. Rear ends of the optical fibers can be held by a ferrule with a rear ferrule portion that surrounds the bare optical fiber in a sliding fit therewith, and with a front portion of the ferrule surrounding the sheath of the optical cable and being crimped thereto in a circular crimp.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A combination of a ferrule and an optical fiber device that includes a single optical fiber and a sheath around said optical fiber where said sheath is stripped from a rear end portion of said optical fiber wherein:

said ferrule includes a rear tubular portion of a first inside diameter that closely surrounds said optical fiber rear end portion, in a sliding fit therewith;

said ferrule including a front tubular portion that is integral with said rear tubular portion, with said front tubular portion being of a second inside diameter that is greater than said first diameter, with said front tubular portion being crimped around said sheath;

said optical fiber device has an axis, and the crimp of said ferrule where radially inward forces have been applied, as seen in a sectional view perpendicular to said axis, extends in a plurality of circular sections of constant radius that are concentric to said axis and that subtend a total angle of at least 320°.

2. The combination described in claim 1 wherein:

said crimp of said ferrule includes at least one section of said ferrule subtending less than 40° about said axis, said ferrule section being V-shaped, with the sides of the V joined together at a location furthest from said axis, as seen in said sectional view.

3. The combination described in claim 2 wherein:

said crimp of said ferrule includes two sections that each subtends an angle of no more than 20° each.

4. A method for use with a vehicle wheel rotation sensor assembly that includes a rotary device that is fixed to a wheel that rotates about a rotation axis and that has a cylindrical portion with angularly-spaced slots therein, and a nonrotatable housing for holding a sensor to detect rotation of said cylindrical portion, comprising;

mounting a sensor on said housing, including positioning first and second optical fibers with front end portions extending along parallel fiber axes that extend parallel to said rotation axis and that lie respectively inside and outside said cylindrical portion, including locating first and second reflective surfaces so they lie respectively inside and outside said cylindrical portion and are in line respectively with said first and second fiber axes;

as said wheel turns, directing light through one of said fibers against a corresponding surface, and through said slots to the other of said reflecting surfaces and reflecting light therefrom to the other of said fibers.

5. Apparatus for sensing rotation of a wheel that is rotatable about a wheel axis on a housing, by detecting rotation of a rotating device that is fixed to the wheel and that has an optical area with a multiplicity of slots therein that are angularly spaced about said axis, comprising:

a frame that is mounted on said housing;

first and second optical fibers mounted on said frame and having fiber tips extending primarily parallel to each other;

said frame having a plurality of light-reflective surfaces oriented to direct light from a first of said fiber tips to a second of said fiber tips, along a light path that extends through said slots of said optical area of said rotary device, to thereby avoid the need to sharply bend either of said fibers;

said optical fibers each comprises a plastic fiber having a diameter of at least 0.5 mm and with a substantially flat tip and no lens between the fiber tip and a corresponding reflective surface, so one fiber emits a lot of light and the other picks up a lot of light without lenses to concentrate light.

6. The apparatus described in claim 5 wherein:

said tips of said optical fibers lie close to said reflective surfaces so an imaginary line connecting said tips of said optical fibers, passes through said rotary device.

7. Apparatus for sensing rotation of a wheel that is rotatable about a wheel axis on a housing, by detecting rotation of a rotating device that is fixed to the wheel and that has an optical area with a multiplicity of slots therein that are angularly spaced about said axis, comprising:

a frame that is mounted on said housing;

a pair of optical fibers that each includes a single optic fiber and a sheath that surrounds the single optical fiber but with an exposed optical fiber rear end portion;

said frame having a plurality of light-reflective surfaces oriented to direct light from a first of said fiber tips to a second of said fiber tips, along a light path that extends through said slots of said optical area of said rotary device;

a pair of ferrules mounted on said frame, with each ferrule including a narrow tubular rear end portion that surrounds one of said exposed fiber rear end portions in a sliding fit therewith, with each ferrule having an integral front portion that is fixed to a corresponding one of said sheaths in a crimp of the ferrule into the sheath;

each of said crimps is a circular crimp that leaves a plurality of circular ferrule crimp sections that all lie on a circle that has a circle axis, with said circular crimp sections subtending an angle of at least 320° about said circle axis.

8. A combination of a ferrule and an optical fiber device that includes a single optical fiber and a sheath around said optical fiber, wherein said sheath is stripped from a rear end portion of said optical fiber and wherein:

said ferrule includes a rear tubular portion of a first inside diameter that closely surrounds said optical fiber rear end portion;

said ferrule including a front tubular portion that is integral with said rear tubular portion, with said front tubular portion being of a second inside diameter that is greater than said first diameter, with said front tubular portion being crimped around said sheath;

said optical fiber device has an axis, and the crimp of said ferrule, as seen in a sectional view taken perpendicular to said axis, extends in a plurality of circular sections that are concentric to said axis and that subtend a total angle of at least about 320°, and at least one noncircular section of no more than 40° where said ferrule is deformed away from said axis in a largely V-shaped deformation where the sides of the largely V-shape merge at a location furthest from said axis.

* * * * *